United States Patent [19]

McNulty

[11] 4,266,508

[45] May 12, 1981

[54] APPARATUS FOR SIMULTANEOUSLY EXERCISING A PLURALITY OF HORSES

[76] Inventor: Robert A. McNulty, P.O. Box 87, Vernon, N.Y. 13476

[21] Appl. No.: 94,042

[22] Filed: Nov. 13, 1979

[51] Int. Cl.³ .............................................. A01K 15/02
[52] U.S. Cl. .......................................... 119/29; 54/71
[58] Field of Search ........................ 119/20, 29; 54/71

[56] References Cited

U.S. PATENT DOCUMENTS

| | | | |
|---|---|---|---|
| 688,818 | 12/1901 | Baker | 119/20 |
| 795,503 | 7/1905 | Garethun | 119/20 |
| 825,970 | 7/1906 | Hoover | 119/29 |

Primary Examiner—Hugh R. Chamblee
Attorney, Agent, or Firm—Richards, Shefte & Pinckney

[57] ABSTRACT

An apparatus for simultaneously exercising a plurality of horses or like animals, having a frame the walls of which define a plurality of spaced stalls within each of which a horse may be confined for exercising. Gates are provided in the frame for entry into and exit from each stall of a horse, and reins are provided in each stall for fastening to the bridle of a horse. A plurality of wheels are affixed to one end of the frame and a towing bar assembly is affixed to the other end thereof to facilitate pulling of the apparatus behind a self-powered vehicle. Horses are exercised by positioning one in each stall, fastening the reins thereof to their bridles, and towing the apparatus behind a self-powered vehicle, causing the horses to jog within their respective stalls in the direction of movement of the vehicle.

8 Claims, 9 Drawing Figures

APPARATUS FOR SIMULTANEOUSLY EXERCISING A PLURALITY OF HORSES

BACKGROUND OF THE INVENTION

The present invention relates to apparatus for exercising horses or like animals, and more particularly to apparatus for simultaneously exercising a plurality of horses or like animals.

For centuries, horses have been domesticated and bred by man for competitive racing, among other purposes. During the evolution of this sport, different, well-defined types of horse racing developed. Among the more popular types of horse racing is harness racing, which encompasses both trotting and pacing races. Typically, only standardbred horses are trained for and participate in harness racing, these horses being an American breed of light horses, largely of Thoroughbred ancestry, bred to attain a standard of speed and noted for their endurance. Those standardbred horses bred and trained to move, when harnessed to a two wheeled racing cart or sulky, at a moderately fast gait in which the legs move in diagonal pairs are typically referred to as "trotters," whereas the term "pacers" designates those horses which have been bred and trained to move, when harnessed to a sulky, with a lateral gait in which the parallel sets of legs move together. The racing cart, or sulky, utilized in such races generally comprises two spaced wheels, a lightweight arched bar spanning the wheels with a seat mounted on the bar midway between the wheels, and two shafts forwardly extending from the bar for attachment to a horse's harness. Specially designed harnessing is used with both trotters and pacers to somewhat restrain and control the horse's gait to achieve the required gait for each type of racing.

Harness racing has grown significantly in recent years, this fact being reflected by the steady growth in the number of racing tracks, scheduled races, and prize money awarded. As a result of this increasing growth and interest, harness racing has progressed from a seasonal, "gentleman's sport" to a year round sport having a significant economic impact upon the locales in which it is popular. As with all types of horse racing, the horses alone represent a sizable monetary investment. It is therefore apparent that the proper training, conditioning, and health care of these racing horses is of primary concern to horse owners and trainers. For this purpose, trotters and pacers are conventionally exercised daily in a manner similar to that in which they race by utilizing a two-wheeled exercise cart, commonly referred to as a "jog cart," which is simply a narrower version of a racing sulky with longer shafts. Thirty minutes of daily exercise on a jog cart is generally considered necessary to achieve a proper conditioning effect and to maintain a horse in proper racing shape.

The disadvantages of this manner of exercise are readily apparent. Although obviously a racing driver is not required for exercise purposes, a trained and qualified driver is required for each jog cart in operation. Such persons are not generally available, and it therefore is often necessary to train personnel in the proper handling of trotters and pacers, and in the proper operation of a jog cart, and to educate such persons as to proper exercise techniques. The equipment required for this type of exercising also represents a significant monetary investment. In addition to the jog cart required, harnessing must be worn by the horse inasmuch as this is the only practical manner of attaching the jog cart to the horse. Boots which partially cover a horse's hooves and legs are also generally worn by the horse during exercise to prevent injury to the horse as a result of its hooves striking its legs during exercising. At presently prevailing prices, the cost of one complete set of this equipment (i.e. jog cart, harness, and boots) generally exceeds one thousand dollars. Of course, each individual piece of equipment is subject to breakage, thereby necessitating periodic repair and maintenance expense, and, in any event, has a limited life, thereby necessitating periodic replacement.

Perhaps even more significant a consideration in this regard is the investment in time required to exercise horses by the jog cart method. As hereinbefore mentioned, at least thirty minutes of exercise is needed daily for each horse. It is therefore evident that the man-hours required to exercise one's horses is directly related to the number of jog carts and qualified drivers available, and increases proportionally with the number of horses to be exercised. Thus, three hours would be required for two drivers utilizing two jog carts to properly exercise twelve horses. This task can be particularly unpleasant during winter months when cold weather can make prolonged outdoor activity such as this almost unbearable for the jog cart drivers. It should also be noted that the above calculation disregards the fact that each horse must be fitted with a harness and attached to the jog cart before it can be exercised and that, at the completion of its exercise period, it must be disengaged from the jog cart, its harness removed, and it must be returned to its stall. The time required to complete this process for each horse to be exercised can greatly increase the overall time required. In addition, each piece of equipment must be cleaned daily at the completion of the overall exercise period, thereby adding to the total man-hours exhausted by this process.

In addition to making the exercising of horses unbearably unpleasant at times, the forces of weather often make it impossible. Since the surface of most racing and exercise tracks is either clay or another type of dirt, rainy weather often makes tracks too muddy to be used. As a result of the excitable nature of horses and the relatively little degree of control exercisable by the driver of a jog cart over the horse harnessed thereto, it is generally inadvisable to attempt to exercise horses on a paved roadway, although it should be recognized that this, in itself, would not be injurious to the horses. Thus, there are times when the daily exercise routine must be forgone.

In spite of the above-outlined disadvantages of the jog cart method of exercising trotters and pacer, relatively few alternative methods or devices have been proposed. One such apparatus is a power operated treadmill exerciser such as the "Anamill" treadmill marketed by Standardbred Anamill, Inc., of Lima, Ohio, or the "Jetline" treadmill marketed by DeMull Sale Barn of Sand Lake, Mich. As with treadmill exercisers utilized by human beings for exercise, these exercise machines suffer certain drawbacks. Although some degree of exercising or training effect may be achieved with such devices, a significant amount of energy and muscular effort is required for a horse to maintain its coordination and balance when jogging in place under the impetus of a treadmill. It is evident that such a device does not adequately simulate jogging on land, and therefore the gait training and muscle development achieved by the jog car method does not result from the use of such devices.

In contrast to the above-described exercise devices, the present invention provides an exercise apparatus with which one person can simultaneously exercise a number of horses without a jog cart or other conventional exercise equipment generally employed, while maintaining a greater degree of control over the horses than with a jog cart, thereby reducing the overall exercise time, the equipment cost, maintenance, and replacement, and the personnel expense required with conventional exercise methods, and making possible the exercising of horses in all types of weather conditions.

SUMMARY OF THE INVENTION

The present invention provides an apparatus for simultaneously exercising a plurality of horses or like animals and comprises a main frame which includes a plurality of upright side walls and a plurality of upright partition walls together defining a plurality of stalls for confining in each stall a horse for exercising. Preferably, the partition walls are so arranged as to create a spacing between adjacent stalls to prevent possible contact between and injury to the horses, this being accomplished in the preferred embodiment by constructing the partition walls to include double wall portions. A plurality of gates are formed in the side walls with at least one gate being formed at each stall to permit entry into and exit from each stall of a horse or like animal. Both the main frame and each stall has a leading end and a trailing end, rein means being associated with the leading end of each stall and fastenable with the head of a horse or like animal for guiding the horse or animal during exercise thereof. Attachment means affixed to the leading end of the main frame is also provided for connecting the main frame with a self-powered vehicle. Affixed to the trailing end are a plurality of rotatable wheels, the wheels preferably being spaced from the trailing end to prevent possible contact therewith and injury of horses in the stalls at the trailing end during exercise thereof. A plurality of horses may be placed on in each stall, fastened to the rein means thereof, and simultaneously exercised with this apparatus by connecting the attachment means with a self-powered vehicle and operating the vehicle to pull the frame therebehind causing the horses to jog safely within their respective stalls in the direction of movement of the vehicle.

In the preferred embodiment of the present invention, a plurality of bar means affixed to the main frame are also provided, one of the bar means transversely spanning each stall intermediate the leading and trailing ends thereof in position to be contacted by a horse attempting to rear in the stall thereby inhibiting any tendency of a horse to do so. Additionally, the trailing end of the stall may be padded to cushion any contact thereof by a horse positioned in any of the stalls.

It is also preferred that the main frame include at the leading end of each stall a generally vertically disposed headboard which extends upwardly a sufficient distance to prevent the head of a horse positioned in any of the stalls from extending thereover during exercise thereof. The headboard includes a surface facing inwardly toward its respective stall which is resistive to degradation thereof resulting from chewing thereof by a horse positioned in any of th stalls and which is both hypoallergenic and non-poisonous to prevent injury to the horse.

By utilizing the present apparatus, one person operating a self-powered vehicle can simultaneously exercise a plurality of horses in the amount of time it would normally take to exercise one horse under the conventional jog cart method, thereby reducing the overall manhours required to exercise any given number of horses. Inasmuch as a jog cart and the harnessing utilized therewith are not necessary for exercising horses with the present invention, the recurring expenses incurred in the purchasing, maintenance, repairing, and replacement thereof are also significantly reduced. Additionally, the enclosed stalls and the utilization of a pulling force to provide the impetus for jogging provide a greater degree of control over the speed and direction of movement of horses being exercised with the present invention. As a result, the present invention may be operated to exercise horses not only on race and exercise tracks but also on paved roadways, thereby making possible the exercising of horses in weather conditions which make such tracks unusable. Further advantages of the present invention will appear in the description of the preferred embodiment which appears hereinafter.

DESCRIPTION OF THE PREFERRED EMBODIMENT

Referring now to the accompanying drawing figures, the exercising apparatus of the present invention is illustrated and is herein described in regard to the preferred embodiment thereof and the best mode of use thereof presently contemplated, i.e. to exercise and condition horses, particularly standardbred trotters and pacers. It should be understood, however, that the present invention may be subject to alternate constructions and may similarly be utilized to exercise other types of horses as well as other animals, whether for racing purposes or otherwise, without departing from the substance or scope of the present invention, the description herein of a particular construction utilized in a particular manner with a particular type of horse being made solely for the purposes of illustration and to facilitate a full description of the present invention.

Figure 1:
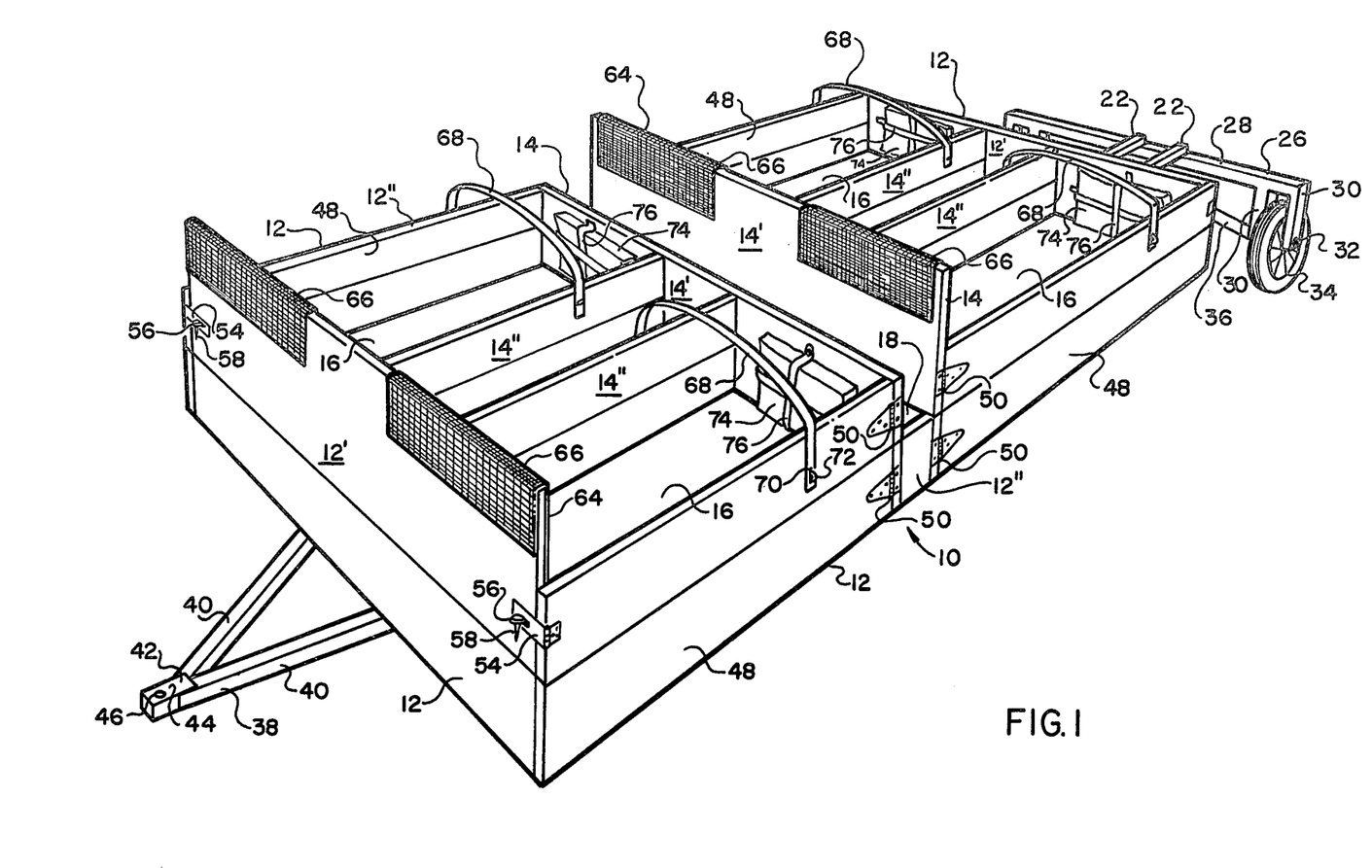
FIG. 1 is a perspective view of the preferred embodiment of the horse exercising apparatus of the present invention.
Figure 3:
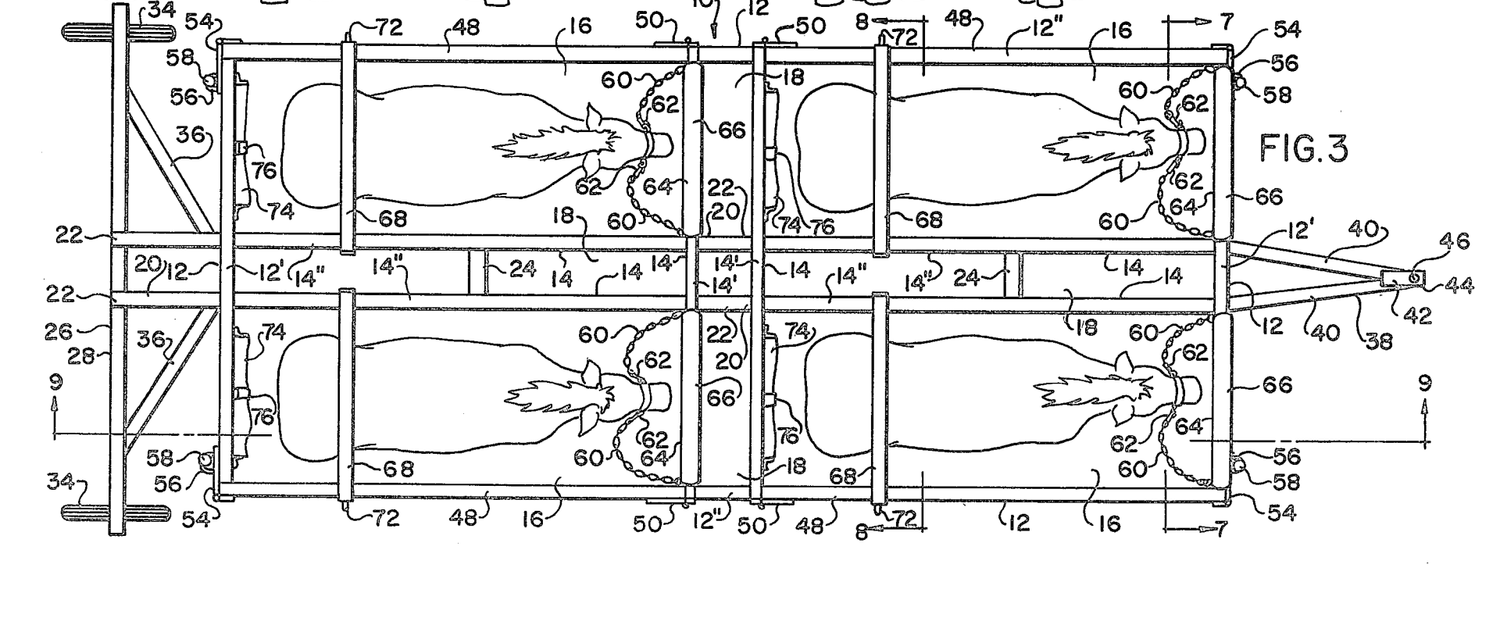
FIG. 3 is a plan view of the apparatus of FIG. 1, also showing a horse positioned in each stall thereof.

Referring first to FIG. 1, an exercising apparatus constructed according to the preferred embodiment of the present invention is illustrated. The apparatus includes a main frame indicated generally at 10, constructed of a plurality of upright side walls 12 and a plurality of upright partition walls 14 arranged and interconnected to define a plurality of stalls 16 each of sufficient dimension to accomodate a horse therewithin for exercising. Preferably, both the main frame 10 and each stall 16 are rectangular in shape. Therefore as best illustrated in FIGS. 1 and 3, the main frame 10 in the preferred embodiment of the present invention includes two pairs of upright side wall members 12', 12" differing respective lengths arranged and interconnected to form the rectangular outer perimeter of the main frame 10. Each division between adjacent stalls 16 is defined by two partition walls 14 arranged in spaced parallel relation to form double wall dividing portions and thereby create a spacing 18 between each stall 16 and all other stalls 16 adjacent thereto to prevent possible contact between and injury of horses in adjacent stalls 16 during exercising thereof. Thus, two spaced partition wall members 14' are connected to and extend transversely between the side wall members 12" of the rectangular outer frame generally midway along the lengths thereof in perpendicular relation thereto, and two spaced partition wall members 14" are connected to and extend between each side wall member 12' and the partition wall member 14' closest thereto generally midway along the respective lengths thereof in perpendicular relation thereto, to define, in cooperation with the side wall member 12', 12", four rectangular stalls 16 of equal size with sufficient length and width dimensions to accommodate a horse, as can be seen in FIG. 3. Of course, the number of stalls 16 with which the present invention may be provided is not limited to four, the present apparatus being capable of construction with any number of stalls 16 subject to space limitations imposed by the size of available exercise areas in which the apparatus could be operated.

To permit relatively unrestricted jogging or running movement of the horse's legs without interference therewith by the main frame 10 during the operation of the present invention as hereinafter described, the main frame 10 also includes a supporting frame 20 which, in cooperation with a wheel assembly 26 and a towing bar assembly 38, supports the side and partition walls of the main frame 10 at a spacing above the ground. The supporting frame 20 is preferably formed of rectangular tubing steel and includes two frame members 22 fixedly held in parallel relation at a spacing equivalent to the spacing 18 created between the stalls 16, by a plurality of cross members 24 extending transversely therebetween and welded thereto. The upright side and partition wall members of the main frame 10 are supported upon the supporting frame 20 of the main frame 10 with the partition wall members 14" superposed over and rigidly affixed to the frame members 22 of the supporting frame 20. Rigidly affixed to one end of the supporting frame 20 is a wheel assembly 26, which includes an arch axle 28 of greater width than the frame 10 extending transversely across and welded to the ends of the frame members 22 in perpendicular relation thereto. A pair of spaced, wheel-supporting legs 30 depend perpendicularly from each outward end of the axle 28, an axle 32 about which a wheel rotates extending between each pair of legs 30 at the lower ends thereof. A support member 35 extends between the two inner legs 30 and is welded thereto, and a stabilizing strut 36 is welded to each inner leg 30 and extends angularly inwardly therefrom to the frame member 22 closest thereto, to which the strut 36 is welded, to provide further support for the wheel assembly 26.

To provide a means of attachment of the main frame 10 to a self-powered vehicle for towing therebehind, a towing bar assembly 38 is rigidly affixed to and extends forwardly from the supporting frame 20 of the main frame 10. The towing bar assembly 38 comprises two arms 40, also preferably formed of rectangular tubing steel, each of which extends angularly downwardly in converging relationship from one of the supporting frame members 22 to a junction point 42 at which the arms 40 are welded together. Also welded to the two arms 40 at the junction point 42 is a conventional attachment assembly for engagement with a conventional trailer hitch or the like (not shown) which is affixed to the end of a self-powered vehicle (also not shown). If the conventional trailer hitch to be used is of the type comprising simply a flat horizontally disposed plate having a hole bored therethrough, the attachment assembly may comprise simply a generally flat tongue 44 (as illustrated in the accompanying drawings) extending outwardly from the junction point 42 and having a correspondingly-sized hole 46 bored therethrough. The apparatus of the present invention may be coupled to the self-powered vehicle by positioning the tongue 44 over and resting it upon the flat plate of the trailer hitch with the respective holes thereof in alignment whereby a pin (not shown) may be inserted through the holes to secure the coupling connection. Of course, any other type of conventional attachment assembly designed for complementary usage with other conventional types of trailer hitching means may be provided; for example, a conventional ball type attachment assembly may be provided at the junction point 42 for usage with ball type trailer hitches.

It is thus apparent that during operation of the apparatus of the present invention the end of the main frame 10 from which the towing bar assembly 38 extends constitutes the leading end of the main frame 10, and that the end of the apparatus at which the wheel assembly 26 is affixed comprises the trailing end of the main frame 10. Similarly, each stall 16 has a leading end and a trailing end, these respective ends of each stall being the ends thereof closest to the leading and trailing ends of the main frame 10. Preferably, the supporting frame 20 of the main frame 10 is slightly longer than the lengthwise dimension of the side wall members 12" of the main frame 10 such that the frame members 22 of the support frame 20 extend beyond the side wall member 12' at the trailing end of the main frame 10, whereby the wheel assembly 26 can be affixed to the trailing end of the main frame 10 at a spacing therefrom. Additionally, as hereinbefore mentioned, the wheel assembly 26 is of a greater width than the frame 10. In this manner, the wheel assembly 26 does not interfere with the stride of horses in the stalls 16 at the trailing end of the main frame 10 during exercising thereof, the spacing between the trailing end and the wheel assembly 26 permitting relatively unrestricted jogging movement of the rear legs of such horses and thereby reducing the likelihood of injurious contact of the horse's legs with the wheel assembly 26.

To permit entry into and exit from each stall 16 of a horse, a plurality of gates 48 are formed in the side walls 12 with at least one gate 48 being formed at each stall 16. In the preferred embodiment illustrated in the drawings, specifically FIG. 4, four gates 48 are formed in the upright side wall members 12″, one gate 48 being provided for each stall 16. The gates 48 constitute integral parts of the side wall members 12″, each gate 48 being pivotably attached at one end thereof to the main frame 10 by hinges 50 for outward pivotal opening movement with respect to its respective stall 16 and extending the length thereof to form an outwardly facing side thereof. In the closed position of the gates 48 illustrated in FIGS. 1 and 3, the free end of each gate 48 abuts one end of the side wall members 12′. To facilitate locking of each gate 48 in this closed position, a slotted latching member 54 is pivotably affixed to the free end of each gate 48 and an eyelet 56 slidable throught the slot 55 of the latching member 54 is affixed at each end of each side wall member 12′. Thus, upon moving of any of the gates 48 to its closed position in abutment with one of the side wall members 12′, the latching member 54 affixed to the gate 48 may be pivoted toward the side wall member 12′ with which the gate 48 abuts to cause the eyelet 56 to extend though the slot 55 of the latching member 54. A pin 58 may then be inserted throught the eyelet 56 to lock the gate 48 in its closed position in abutment with the side wall member 12′, as best seen in FIG. 1. Of course, any other conventional type of latching or locking assembly could also be utilized for this purpose. it being necessary only that some means be provided for holding the gates 48 in their respective closed positions during operation of the present apparatus.

Figure 2:
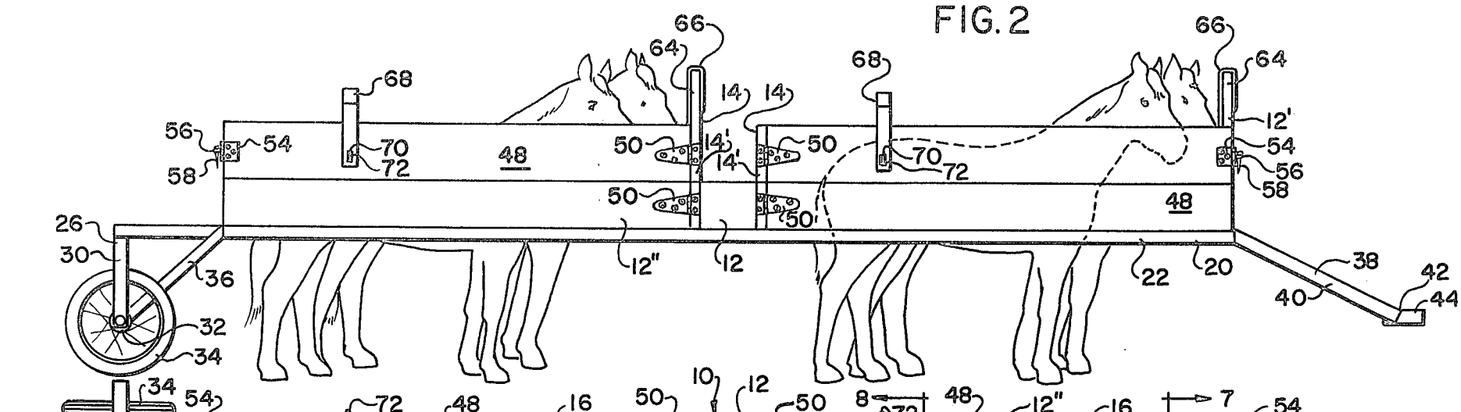
FIG. 2 is a side elevational view of the apparatus of FIG. 1, with a horse positioned in each stall thereof.

As best seen in both FIGS. 2 and 3 and as is believed apparent from the above description, one horse may be placed in each stall for exercising, each horse being positioned in its respective stall with its head facing the leading end of the stall and its rump at the trailing end. As will be more fully explained hereinafter, it is contemplated that the exercising of horses be effected by so positioning a horse in each stall 16, and by pulling the apparatus of the present invention behind a self-powered vehicle to cause the horses to jog within their respective stalls in the direction of movement of the vehicle. It is apparent that merely confining each horse within a stall during operation of the present apparatus does not give the operator a sufficient degree of control over the movement of the horses during operation to reduce the risk of injury to the horses should any one of them fail to move forward with the apparatus. Therefore, to effectively lead and guide the horses during operation of the present apparatus in the direction of movement thereof, means, preferably similar to the reins used in the harness racing by the sulky driver to control the horse, must be provided with which the horses are directly connected to the apparatus so that, upon forward operational movement of the present apparatus, the horses are pulled forward and thereby urged to move or jog within their respective stalls. Thus, within each stall 16 in the preferred embodiment of the present apparatus, two relatively short and equal lengths of chain 60 are rigidly affixed to the upright wall member of the main frame 10 forming the leading end of the stall 16 at opposite sides of the leading end thereof and extend inwardly within the stall 16 (see FIGS. 4 and 7). At the end of each length of chain 60 is a conventional spring loaded latch 62 for fastening to opposite sides of the bridle or headgear of a horse. By attaching the latches 62 of each stall 16 to the bridle of the horse positioned in the stall 16 for exercising, the horses are effectively controlled within their respective stalls and are led or pulled forward upon any forward movement of the apparatus and caused to jog or move within their respective stalls 16.

Since the head of each horse positioned in the stalls 16 of the present apparatus for exercising will be connected or fastened in the above-described manner to the upright wall member of the main frame 10 forming the leading end of their respective stalls, it is preferred that the upright wall member at the leading end of each stall 16 extend upwardly a sufficient distance or to a sufficient height to prevent any horse in any of the stalls 16 from extending its head over the upright wall at the leading end of its stall 16 and thereby prevent injury to horses being exercised with the present apparatus which might result therefrom. In the preferred embodiment of the present invention, the upright side wall member 12′ forming the leading end of the two forward stalls 16 and the upright partition wall member 14′ forming the leading end of the two rear stalls 16 are constructed with a greater vertical dimension than the remaining side wall members 12′, 12″ and partition wall members 14′,14″ so as to extend, in the assembled apparatus, upwardly to a greater extent than the remaining upright wall members of the main frame 10 and to a greater height than the height of an ordinary horse, thereby forming a headboard 64 at the leading end of each stall 16 (see FIGS. 1, 2 and 7). It has been discovered that, as is the nature of most horses, horses positioned in the stalls 16 for exercise tend to chew on the headboard 64 during any period of inactivity when the present apparatus is not in operation. The surface of each headboard 64 facing inwardly toward each stall 16 should therefore be resistive to degradation thereof as a result of chewing thereon by a horse, and should also be both hypo-allergenic and non-poisonous to prevent any resulting injury to the horse. Therefore, in the preferred embodiment of the present invention, a sheet of heavy canvas material 66 is affixed to and extends over the upper extent of each headboard 64 at the leading end of each stall 16. It has been found that canvas material is highly resistive to shearing or tearing thereof by the teeth of a horse and that horses suffer no ill or adverse effects from chewing on such material.

The standardbred horses used in harness racing, being generally high strung animals, may at times also have a tendency to rear, and, therefore, some means should be provided to inhibit any tendency of a horse to rear while in any of the stalls 16 to prevent any danger of resulting injury to the horse. For this purpose, an arched bar 68 transversely spans each stall 16 intermediate the leading and trailing ends thereof in position to be contacted by a horse in any of the stalls 16 attempting to rear. Each bar 68 is pivotably affixed at one end thereof to the partition wall member 14″ forming the inward side wall of its respective stall 16 on the side of the partition wall member 14″ facing outwardly of its stall 16, and extends therefrom transversely across its respective stall 16. At the other end of each bar 68 is formed a slot 70 for extension therethrough of an eyelet 72 affixed to the outwardly facing side of each gate 48. In this manner, each bar 68 may be pivoted upwardly and inwardly of its respective stall 16 to permit opening of the gate 48 to the stall 16 and the entry thereinto and positioning therein of a horse. Once the horse is positioned in the stall 16 and the gate 48 closed, the bar 68 may be pivoted downwardly to the position thereof shown in FIGS. 2 and 3 engaging the eyelet 72, with the eyelet 72 extending through the slot 70 of the bar 68, whereby the bar 68 may be secured in this position during operation of the present apparatus by inserting through the eyelet a pin or the like (not shown). For somewhat similar purposes, a foam pad or cushion 74 is affixed, as by strappings 76, at the trailing end of each rear stall 16 to the upright side wall member 12' forming the trailing end of the rear stalls 16 and, at the trailing end of each forward stall 16 to the upright partition wall member 14' forming the trailing end of the forward stalls 16, to cushion any contact by a horse positioned in any of the stalls 16 with the trailing end thereof and thus prevent any bruising or other injury of the horse thereby. Alternatively, a resilient rubber strap or the like may be attached transversely between the wall members 12" and 14" at the trailing end of each stall 16 to prevent such contact.

Figure 4:
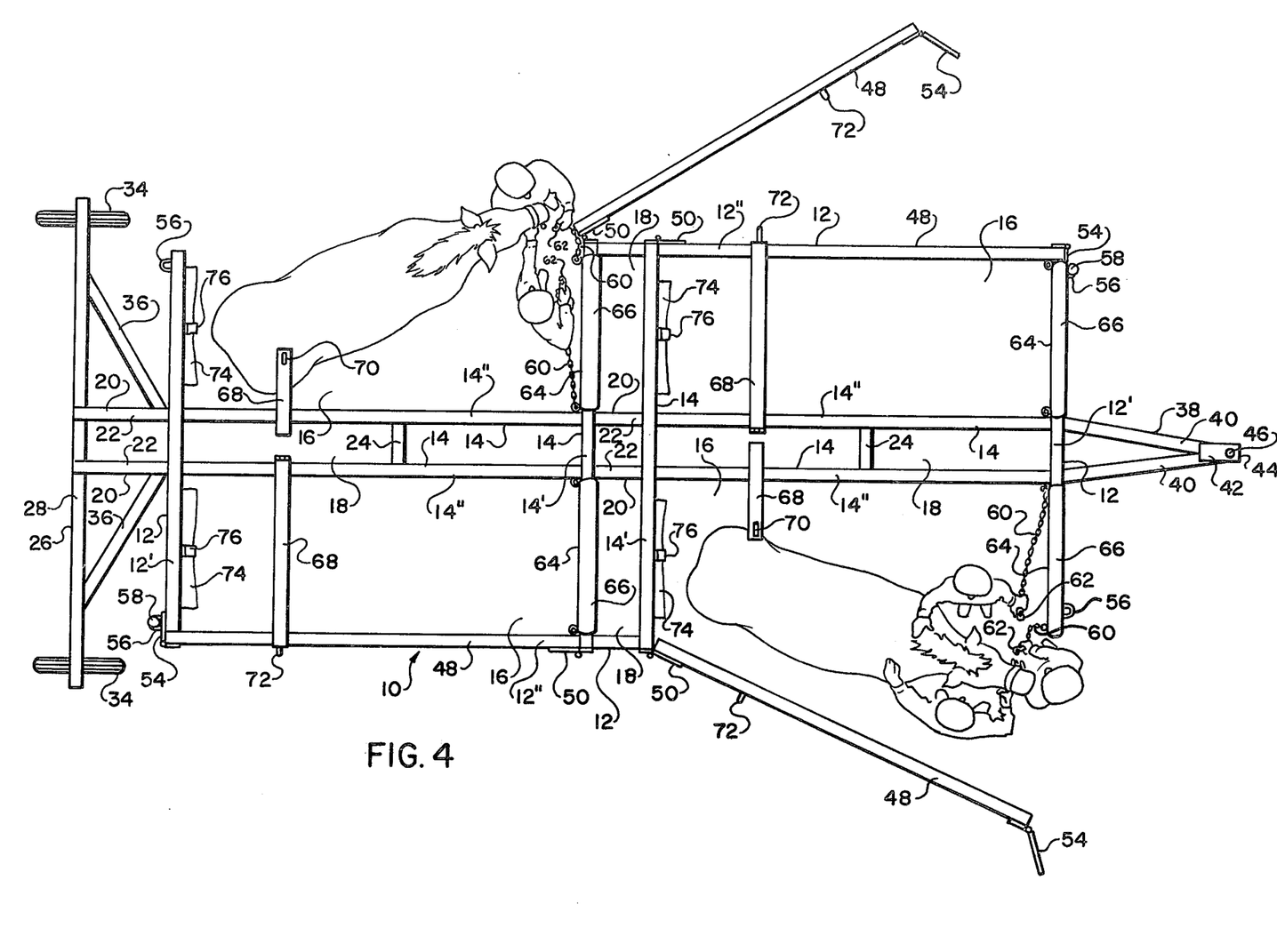
FIG. 4 is a plan view of the apparatus of the present invention similar to FIG. 3, illustrating the manner in which horses are led into and positioned in the stalls.
Figures 5, 6, 7, 8, 9:
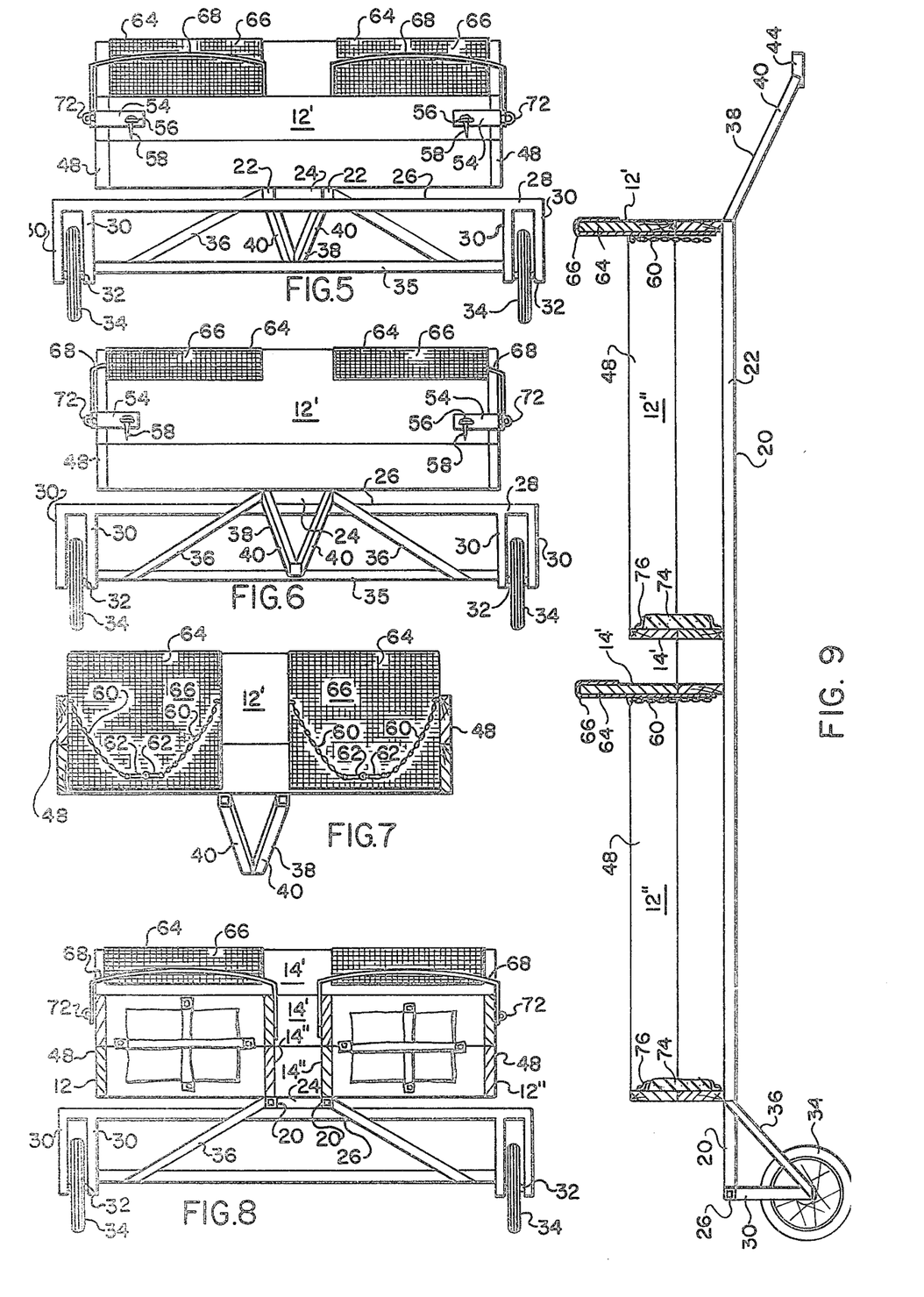
FIG. 5 is a rear elevational view of the apparatus of FIG. 1.
FIG. 6 is a front elevational view of the apparatus of FIG. 1.
FIG. 7 is a vertical sectional view of the apparatus of the present invention taken along line 7—7 of FIG. 3 but omitting the horses of FIG. 3.
FIG. 8 is a vertical sectional view of the apparatus of the present invention taken along line 808 of FIG. 3 but omitting the horses of FIG. 3.
FIG. 9 is a vertical sectional view of the apparatus of the present invention taken along line 9—9 of FIG. 3, omitting the horses of FIG. 3.

The operation of the apparatus of the present invention for simultaneously exercising a plurality of horses is believed readily apparent from the above description of the apparatus, but will nevertheless be presently described. Initially, the apparatus of the present invention is connected to any self-powered vehicle having a trailer hitch complementary with the type of trailer hitching attachment assembly with which the towing bar assembly 38 of the apparatus is provided. The bars 68 are then pivoted upwardly and the gates 48 of the apparatus pivoted outwardly to open the stalls 16 of the apparatus whereby a horse may be led into and positioned in each stall 16 with its head facing the headboard 64 and its rump at the trailing end thereof, and the latches 62 at the ends of the chains 60 of each stall 16 attached to opposite sides of the horse's bridle, all as is illustrated in FIG. 4. Once the horses are so positioned in the stalls 16 and the chains 60 fastened to their respective bridles, the gates 48 are closed, the latch members 54 and eyelets 56 lockingly engaged, and the bars 68 pivoted downwardly and lockingly engaged with the eyelets 72. Upon forward operation of the self-powered vehicle, the apparatus of the present invention is pulled forwardly therebehind, the forward movement thereof also pulling the horses forward under the influence of the chains 60, causing the horses to jog safely within their respective stalls in the direction of movement of the self-powered vehicle. It has been found that the optimum speed at which the self-powered vehicle should be operated to best approximate the speed at which horses are exercised using jog carts is approximately fifteen miles per hour.

The comparative advantages of exercising horses with the apparatus of the present invention over conventional methods of exercise are numerous. Perhaps the most apparent advantage is the overall savings in time and labor expense made possible by the utilization of a single apparatus to simultaneously exercise a plurality of horses. Once four horses have been properly positioned in each stall 16 and attached to the chains 60 thereof, a driver to operate the self-powered vehicle is the only person required for operation of the present apparatus to exercise the four horses (although it may sometimes be desirable to utilize a second person to constantly watch the horses during the exercise period) whereas one jog cart driver for every horse would be necessary under conventional methods. Therefore, although thirty minutes of daily exercise for each horse to be exercised is still necessary even with the present apparatus, a significant reduction in the overall number of man hours required to exercise any given number of horses, and accordingly a significant reduction in the labor expense associated with the daily exercise of one's horses, may be realized by utilizing the present apparatus. For example, two persons utilizing one apparatus constructed according to the present invention could exercise twelve horses in three groups of four horses each in one and one-half hours. As hereinbefore noted, three hours would be required for the same two persons to exercise the same twelve horses utilizing two jog carts. Additionally, no special skills, knowledge, or training in the handling or exercising of horses are required to qualify a person to exercise horses with the present apparatus, making possible the utilization of less expensive, unskilled labor in the exercising of one's horses, thereby further reducing the overall labor expense involved therein.

The use of the present apparatus to exercise horses also makes possible the reduction of other exercise-related expenses involved in the process of training horses for harness racing. Since one of the major purposes of the harness conventionally used is to provide a means for connecting a horse with a jog cart, it is unnecessary for horses being exercised with the present apparatus to wear a harness although this may sometimes be desirable for the purpose of training the horses in the proper gait required for harness racing. By providing an enclosed stall within which the horses jog during exercising and by utilizing a pulling force to provide the impetus for jogging, a greater degree of control is maintained over both the speed and direction of movement of horses being exercised with the present invention than is possible when using a job cart. As a result, it is also generally unnecessary for horses being exercised with the present apparatus to wear boots during exercising inasmuch as the greater degree of control maintained over the horses with the present apparatus lessens the chance of uncontrolled movement by the horses which may result in injurious contact between the horses' hooves and their legs. Consequently the purchase, maintenance, repair and replacement expenses associated with the use of such items during exercising may be significantly reduced.

The above-mentioned greater degree of control maintained over horses during exercising thereof with the present apparatus also enables trainers to exercise their horses on roadways and other surfaces over which it would generally be unsafe to exercise a horse using a jog cart. As a result of this, it is possible to exercise horses under most weather conditions which ordinarily would make a dirt surface exercise or racing track unusable. Since most types of self-powered vehicles which would be particularly adaptable to use with the present apparatus have an enclosed compartment for the operators thereof, the task of exercising horses in poor weather conditions is significantly more pleasant for the operators with the present apparatus. Finally, in the normal routine of racing trotters and pacers, it is not uncommon for relatively long periods of time to elapse between races for any particular horse during which time the horse, although being exercised daily, is not exposed to actual racing conditions if conventional exercising methods are being employed. As a result, horses have been known to balk and refuse to move, or trot or pace on gait when brought behind a starting gate and urged to run therebehind to begin a race. With daily exercise utilizing the present invention, horses become acclimated to following the headboards thereof and to jogging alongside other horses in a manner similar to that expected of them under actual race conditions.

The present invention has been described in detail above for purposes of illustration only and is not intended to be limited by this description or otherwise to exclude any variation or equivalent arrangement that would be apparent from, or reasonably suggested by, the foregoing disclosure to the skill of the art.

I claim:

1. An apparatus for simultaneously exercising a plurality of horses or like animals comprising a main frame including a plurality of upright side walls, and a plurality of upright partition walls, together defining a plurality of stalls for confining in each said stall a horse or like animal for exercising, said main frame and each said stall having a leading end and a trailing end, a plurality of gates formed in said side walls, at least one said gate being formed at each said stall to permit entery into and exit from each said stall of a horse or like animal, rein means associated with said leading end of each said stall and fastenable with the head of a horse or like animal for guiding the horse or like animal during exercise thereof, attachment means affixed to said leading end of said main frame for connection of said main frame with a self-powered vehicle, and a plurality of rotatable wheels affixed to the trailing end of said main frame, whereby a plurality of horses may be placed one in each said stall, fastened to the rein means thereof and simultaneously exercised by connecting said attachment means with a self-powered vehicle and operating said vehicle to pull said frame therebehind causing said horses to jog safely within their respective stalls in the direction of movement of said self-powered vehicle.

2. An apparatus for simultaneously exercising a plurality of horses of like animals according to claim 1 and characterized further in that said partition walls are arranged to create a spacing between each stall and all other stalls adjacent thereto to prevent possible contact between and injury of horses in adjacent stalls during exercising thereof.

3. An apparatus for simultaneously exercising a plurality of horses or like animals according to claim 2 and characterized further in that said partition walls include double wall portions spaced to provide said spacings.

4. An apparatus for simultaneously exercising a plurality of horses or like animals according to claim 1 and characterized further in that said plurality of wheels are spaced from said trailing end of said main frame to prevent possible contact therewith and injury of horses in the stalls at said trailing end during exercising thereof.

5. An apparatus for simultaneously exercising a plurality of horses or like animals according to claim 1 and characterized further by a plurality of bar means affixed to said main frame, one said bar means transversely spanning each said stall intermediate said leading and said trailing ends thereof in position to be contacted by a horse or like animal attempting to rear in the stall, thereby inhibiting any tendency of a horse or like animal to rear while in any of said stalls.

6. An apparatus for simultaneously exercising a plurality of horses or like animals according to claim 1 and characterized further in that said trailing end of each said stall is padded to cushion any contact thereof by a horse or like animal positioned in any of said stalls.

7. An apparatus for simultaneously exercising a plurality of horses or like animals according to claim 1 and characterized further in that said main frame includes at said leading end of each said stall a generally vertically disposed headboard which extends upwardly a sufficient distance to prevent the head of a horse or like animal positioned in any of said stalls from extending thereover during exercise thereof.

8. An apparatus for simultaneously exercising a plurality of horses or like animals according to claim 7 and characterized further in that each said headboard includes a surface facing inwardly toward its respective stall which is resistive to degradation thereof resulting from chewing thereof by a horse or like animal positioned in any of said stalls and which is both hypo-allergenic and non-poisonous to prevent injury to the horse or like animal as a result of chewing theron.

* * * * *